US008965143B2

(12) United States Patent
Wong et al.

(10) Patent No.: US 8,965,143 B2
(45) Date of Patent: Feb. 24, 2015

(54) SYSTEM FOR ENHANCING CONTENT

(75) Inventors: Timothy Wong, Sunnyvale, CA (US); Gavan Kwan, Mountain View, CA (US); Eron Samuel Steger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 148 days.

(21) Appl. No.: 13/612,571

(22) Filed: Sep. 12, 2012

(65) Prior Publication Data

US 2013/0064450 A1 Mar. 14, 2013

Related U.S. Application Data

(60) Provisional application No. 61/533,758, filed on Sep. 12, 2011.

(51) Int. Cl.
*G06K 9/40* (2006.01)
*G06T 5/00* (2006.01)
*G06T 5/40* (2006.01)
*G06T 5/50* (2006.01)

(52) U.S. Cl.
CPC . *G06T 5/009* (2013.01); *G06T 5/40* (2013.01); *G06T 5/50* (2013.01); *G06T 2207/10016* (2013.01); *G06T 2207/10024* (2013.01)
USPC .......................................... 382/274; 382/168

(58) Field of Classification Search
USPC .................................. 382/168, 169, 172, 274
See application file for complete search history.

(56) References Cited

U.S. PATENT DOCUMENTS

| 7,020,353 | B1 * | 3/2006 | McCaffrey et al. ........... 382/312 |
| 7,068,838 | B2 | 6/2006 | Manbeck et al. |
| 7,953,286 | B2 * | 5/2011 | Chiang et al. .................. 382/254 |
| 8,264,594 | B2 * | 9/2012 | Yeo et al. ....................... 348/362 |
| 2006/0269125 | A1 | 11/2006 | Kalevo et al. |
| 2009/0027545 | A1 | 1/2009 | Yeo et al. |
| 2010/0073494 | A1 | 3/2010 | Hirose et al. |

OTHER PUBLICATIONS

International Search Report for and Written Opinion of the International Searching Authority for International Patent Application No. PCT/US12/54917 mailed Nov. 20, 2012, 7 pages.

\* cited by examiner

*Primary Examiner* — Phuoc Tran
(74) *Attorney, Agent, or Firm* — Lowenstein Sandler LLP

(57) ABSTRACT

A system and method for enhancing a content file is disclosed. The system comprises a histogram module, a contrast stretching module and a brightness module. The histogram module generates a histogram including data that describes one or more pixel intensities for one or more channels included in a content file. The contrast stretching module adjusts the one or more pixel intensities for the one or more channels included in the content file based at least in part on the histogram. The brightness module is communicatively coupled to the contrast stretching module for determining whether a brightness level for the content file is within a range describing one or more acceptable brightness levels. The brightness module adjusts the brightness level for the content file responsive to determining that the brightness level for the content file is outside the range.

21 Claims, 8 Drawing Sheets

SYSTEM FOR ENHANCING CONTENT

CROSS REFERENCE TO RELATED APPLICATIONS

This application claims priority under 35 USC §119(e) to U.S. Application No. 61/533,758, entitled "System for Enhancing Content" filed Sep. 12, 2011, the entirety of which is herein incorporated by reference.

BACKGROUND

The specification relates to a data management system. In particular, the specification relates to a system for enhancing content.

Increasing numbers of users view content, such as video data, online using one or more video hosting sites. Additionally, many video hosting sites allow users to upload video content to the video hosting site. Often, users viewing content desire to modify the image quality of the content. However, existing methods of modifying the image quality are difficult to implement. Many users do not possess the technical expertise needed to modify the image quality of the content. Existing methods also take too much time so that most users do not attempt to modify the content.

SUMMARY

In accordance with an embodiment, a system for enhancing the image of a content file includes a video hosting site is described. A content hosting site manages content such as videos that are accessed by clients. Publishers upload video content to the video hosting site. The content hosting site pushes videos uploaded by publishers to the client. In one embodiment, the client uploads video content.

In one embodiment, the content hosting site manages pictures that are accessed by clients. Publishers upload picture content to the video hosting site. The content hosting site pushes pictures uploaded by publishers to the client. In one embodiment, the client uploads picture content.

Specifically, embodiments disclosed herein provide a system and method for enhancing a content file. The system comprises a histogram module, a contrast stretching module and a brightness module. The histogram module generates a histogram including data that describes one or more pixel intensities for one or more channels included in a content file. The contrast stretching module adjusts the one or more pixel intensities for the one or more channels included in the content file based at least in part on the histogram. The brightness module determines whether a brightness level for the content file is within a range describing one or more acceptable brightness levels. The brightness module adjusts the brightness level for the content file responsive to determining that the brightness level for the content file is outside the range.

In one embodiment, the system enhances the image of the content file responsive to a user input including data indicating that the user wants to enhance the image. In another embodiment, the system enhances the image at the time that the content file is uploaded to the content hosting site. For example, a user uploads a content file and the content hosting site transmits a message to the user asking them whether they want to enhance the image. In another example, the user uploads the content file and the content hosting site enhances the image without asking for input from the user.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Embodiments are illustrated by way of example, and not by way of limitation in the figures of the accompanying drawings in which like reference numerals are used to refer to similar elements.

DETAILED DESCRIPTION

Figure 1:
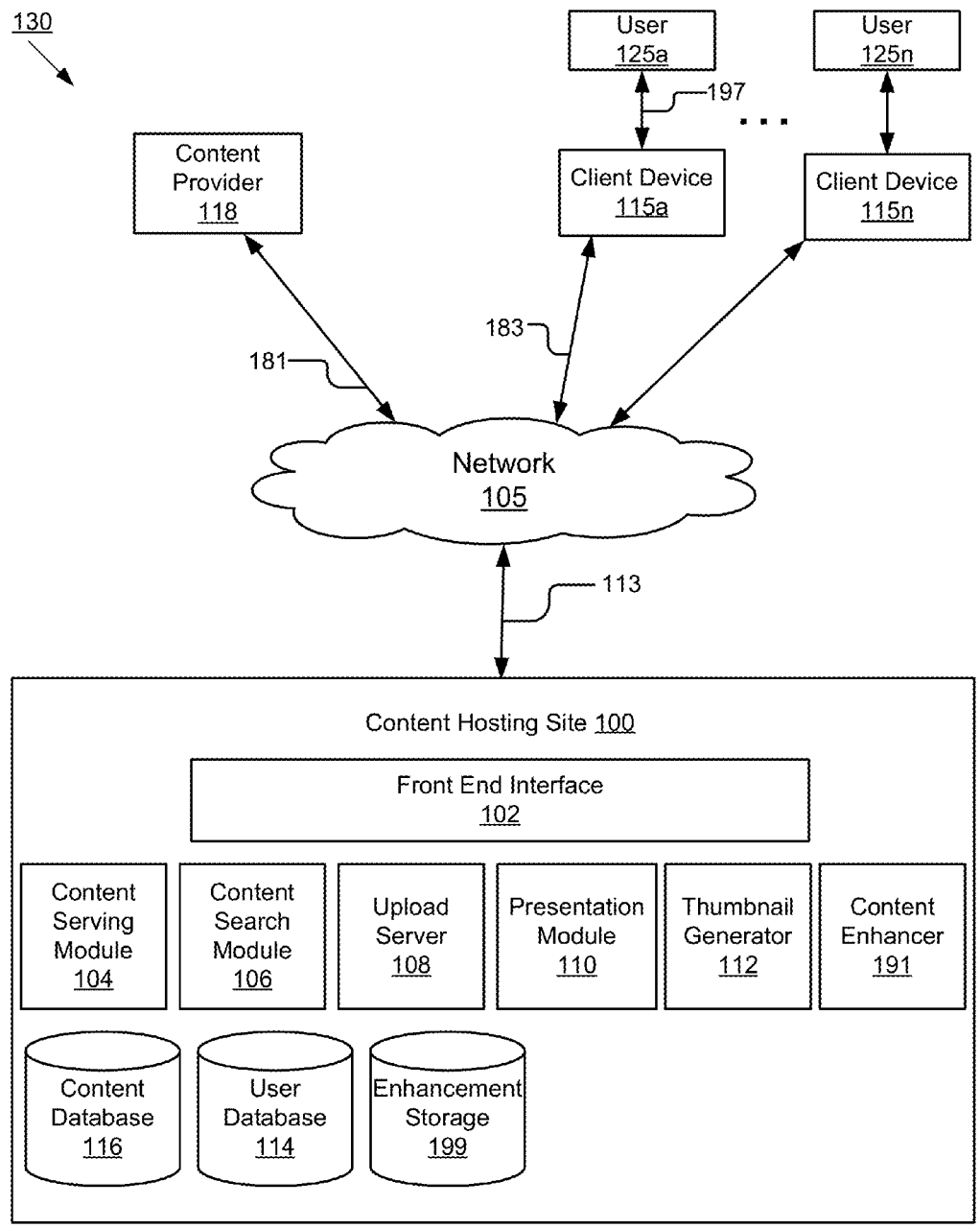
FIG. 1 is a high-level block diagram of system for enhancing content in accordance with an embodiment.

A system and method for enhancing content is described below. In the following description of the embodiments, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details. For example, an embodiment is described below with reference to user interfaces and particular hardware. However, other embodiments can be described with reference to any type of computing device that can receive data and commands, and any peripheral devices providing services.

Reference to "one embodiment" or "an embodiment" means that a particular feature, structure, or characteristic described in connection with the embodiment is included in at least one embodiment. The appearances of the phrase "in one embodiment" in various places in the description are not necessarily all referring to the same embodiment.

Some portions of the following description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following description, it is appreciated that throughout the description terms such as "processing," "computing," "calculating," "determining," "displaying" or the like, refer to the action and processes of a processor-based computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk—read only memory (CD-ROM), compact disk—read/write (CD-R/W) and digital video disc (DVD).

The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

System Overview

FIG. 1 is a high-level block diagram illustrating an embodiment of a system 130 for enhancing content. Content, as used herein, includes videos and pictures hosted by the content hosting site 100. The illustrated embodiment of the system 130 includes: client devices 115a, 115n (referred to collectively or individually as client devices 115) that are accessed by users 125a, 125n (referred to collectively or individually as users 125), a content provider 118, and a content hosting site 100. The content hosting site 100 includes, among other elements described below, a content enhancer 191.

Although only one content provider 118, two client devices 115 and one content hosting site 100 are illustrated in FIG. 1, persons having ordinary skill in the art will recognize that any number of content providers 118, client devices 115 and content hosting sites 100 can be communicatively coupled to the network 105. Furthermore, while only one network 105 is coupled to the client devices 115, the content provider 118 and the content hosting site 100, persons having ordinary skill in the art will appreciate that any number of networks 105 can be connected to the client devices 115, the content provider 118 and the content hosting site 100.

The network 105 is a conventional type of network, wired or wireless, and may have any number of configurations such as a star configuration, token ring configuration or other configurations known to those skilled in the art. In one embodiment, the network 105 comprises one or more of a local area network (LAN), a wide area network (WAN) (e.g., the Internet), and/or any other interconnected data path across which multiple devices communicate. In another embodiment, the network 105 is a peer-to-peer network. The network 105 is coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

In the illustrated embodiment, the content hosting site 100 is communicatively coupled to the network 105 via signal line 113. The content provider 118 is communicatively coupled to the network 105 via signal line 181. The client 115a is communicatively coupled to the network 105 via signal line 183. The user 125a interacts with the client device 115a as represented by signal line 197. Client device 115n and user 125n are coupled and interact in a similar manner.

The content hosting site 100 is any system that allows a user to access intellectual property content via searching and/or browsing interfaces. It will be understood that the term "web site" represents any computer system adapted to serve content using any internet working protocols, and is not intended to be limited to content uploaded or downloaded via the Internet or the HTTP protocol.

In one embodiment, the content hosting site 100 is configured to receive and share all or a portion of any content such as a video or a picture. Persons having ordinary skill in the art will also recognize that the content can be represented in any media type and/or file type. For example, the content hosting site 100 shares content such as one or more of a video file and an image file (such as a JPEG or GIF file).

In one embodiment, sources of contents provided by the content hosting site 100 are from uploads of contents by users 125 operating a client device 115, searches or crawls of other web sites or databases of contents, or the like, or any combination thereof. For example, in one embodiment, a content hosting site 100 is configured to allow uploads of contents by users 125. In another embodiment, the content hosting site 100 is configured to only obtain contents from other sources by crawling such sources or searching such sources in real time.

The content hosting site 100 is communicatively coupled to the network 105. In the illustrated embodiment, the content hosting site 100 includes: a front end interface 102; a content serving module 104; a content search module 106; an upload server 108; a presentation module 110; a thumbnail generator 112; a user database 114; a content database 116; and a content enhancer 191. In one embodiment, the components of the content hosting site 100 are communicatively coupled to one another. For example, they are communicatively coupled to one another via a bus (not pictured). Other conventional features, such as firewalls, load balancers, authentication servers, application servers, failover servers, site management tools, and so forth are not shown so as not to obscure the feature of the system.

In one embodiment, the illustrated components of the content hosting website 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the content hosting site 100 are performed by one or more client devices 115 in other embodiments if appropriate. In one embodiment, the functionality attributed to a particular component is performed by different or multiple components operating together.

In one embodiment, each of the various modules are implemented as a server program executing on a server-class computer comprising one or more central processing units ("CPU," or "CPUs" if plural), memory, network interface, peripheral interfaces, and other well-known components. The computers themselves preferably run an open-source operating system such as LINUX, have generally high performance CPUs, 1 gigabyte or more of memory, and 100 gigabyte or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in tangible computer accessible storage mediums (e.g., random access memory ("RAM"), flash, hard disk, optical/magnetic media, or solid-state drive ("SSD"), etc.).

The front end interface 102 is an interface that handles communication with one or more of the content provider 118 and the client devices 115 via the network 105. For example, the front end interface 102 receives a content file uploaded from the content provider 118 and delivers the content to the upload server 108. In one embodiment, the front end interface 102 receives requests from users 125 of the client devices 115 and delivers the requests to the other components of the content hosting site 100 (e.g., the content search module 106 or the content serving module 104). For example, the content is a video and the front end interface 102 receives a video search query from a user and sends the video search query to the content search module 106.

The upload server 108 receives one or more content files from the content provider 118 via the front end interface 102. For example, the upload server 108 receives one or more of a video file and an image file such as a JPEG or GIF from the content provider 118. In one embodiment, the upload server 108 processes the one or more contents and stores the processed contents in the content database 116. The upload server 108 assigns a content identification ("content ID") to the stored content file. A content ID includes identifiers for videos ("video ID") and pictures ("image ID"). For example, the upload server 108 assigns a video ID to a video and stores the video together with the video ID in the content database 116. In other embodiments, the upload server 108 performs one or more of: formatting a content; compressing a content; metadata tagging a content; content analysis, etc.

The content database 116 is a storage system that stores content shared by the content hosting site 100 with the users 125. In one embodiment, the content database 116 stores the content files processed by the upload server 108. In another embodiment, the content database 116 also stores metadata associated with the content files. The metadata includes one or more of: a title; a description; tag information; a time length; and the like. In one embodiment, some or all of the metadata of the content files is provided by the content provider 118. For example, a user of the content provider 118 provides a title and a description of a content when uploading the content to the content hosting site 100.

The content search module 106 includes code and routines that, when executed by a processor (not pictured), processes any search queries received by the front end interface 102 from users 125. A search query received by the front end interface 102 from a user 125 includes search criteria such as keywords that identify content the user is interested in. The content search module 106 uses the search criteria to query the metadata of the content files stored in the content database 116. The search results for the query are returned to the front end interface 102 for presentation to the user 125. For example, if a user 125 provides the front end interface 102 with a keyword search query, the content search module 106 identifies a content file stored in the content database 116 related to the keyword and returns the search result (e.g., content IDs and/or metadata such as titles, descriptions, thumbnails of the identified content files) to the front end interface 102.

The content serving module 104 includes code and routines that, when executed by a processor (not pictured), processes requests for a content (e.g., a video, a book, a picture, a music file, etc) and provides the content to users. For example, the content serving module 104 receives a query from a user via the front end interface 102, retrieves a set of videos from the content database 116 based at least in part on the query and presents the set of videos to the user via the front end interface 102.

In one embodiment, the content serving module 104 receives a request from a user to access a content when the user clicks on a link to the content. The request received from the user includes the content ID of the content that the user wishes to access. In one embodiment, the content ID is included automatically in the request once the user clicks on the link for the content. The content serving module 104 uses the content ID to search and locate the content in the content database 116. Once the requested content is located, the content serving module 104 transmits the content to the user via the front end interface 102. The content is presented to the user on a web page. Metadata associated with the content is also presented with the content, such as the title and description of the content. In one embodiment, the content serving module 104 stores the content ID of the content in the user database 114 after sending the content to the user so that a content history of the user is stored in the user database 114.

The user database 114 is a storage system that stores data and/or information associated with a user. For example, the user database 114 stores the content IDs of content files uploaded by a user to the content hosting site 100 and the content IDs of content files that the user has accessed from the content database 116. In one embodiment, the user is identified by using a login name and password and/or by using the user's internet protocol address.

The thumbnail generator 112 includes code and routines that generates a thumbnail for a content. A thumbnail is a picture that represents a content in the content hosting site 100. For example, assume the content is a video. The thumbnail generator 112 analyzes the video and selects a frame of the video as the thumbnail. In one embodiment, the thumbnail generator 112 provides one or more pictures for the video and the user uploading the video to the content hosting site 100 selects one picture as the thumbnail.

The presentation module 110 includes code and routines that, when executed by a processor (not pictured), presents any information intended for a user to a corresponding client device such as the client device 115. For example, the presentation module 110 generates a graphic associated with the contents stored in the content database 116 or the ownership information stored in the ownership database 128 and sends the graphic to a web browser (not pictured) installed in the client device 115 via the front end interface 102 and the network 105.

The content enhancer 191 includes code and routines configured to provide the functionality described below with reference to FIGS. 2-8.

The content provider 118 is any device that provides contents to the content hosting site 100. For example, the content provider 118 is a computing device that uploads a content to the content hosting site 100. The content provider 118 is communicatively coupled to the network 105. In one embodiment, the content provider 118 is also a client device 115. In one embodiment, the content provider 118 is the same entity that operates the content hosting site 100.

In one embodiment, the content provider 118 is configured to operate a client device to perform various content provider functions. Examples of the content provider functions include, but are not limited to: uploading a content to the content hosting site 100; editing a content stored by the content hosting site 100; removing a content from the content hosting site 100; and editing content provider preferences associated with a content.

The client devices 115 are any processor-based computing devices. The client device 115 executes client software such as a web browser or built-in client application and connects to the content hosting site 100 via the network 105. In one embodiment, the client device 115 includes a variety of different computing devices. Examples of a client device 115 include, but are not limited to: a personal computer; a personal digital assistant; a television set-up box; a tablet computer; a smart phone; and a laptop computer. The client device 115 comprises a processor (not pictured), a memory (not pictured) and other components conventional to a computing device. In one embodiment, the client device 115 is communicatively coupled to the network 105.

In one embodiment, the client device 115 is configured as a content provider 118 to provide contents to the content hosting site 100. In one embodiment, the client device 115 is configured to retrieve contents stored by the content hosting site 100. For example, the client device 115 includes an embedded video player (e.g., the Flash™ player from Adobe System, Inc.) adapted for the video content formats used in the content hosting site 100 so that a user is able to view a video from the content hosting site 100 using the embedded video player.

Content Enhancer 191

Figure 2:
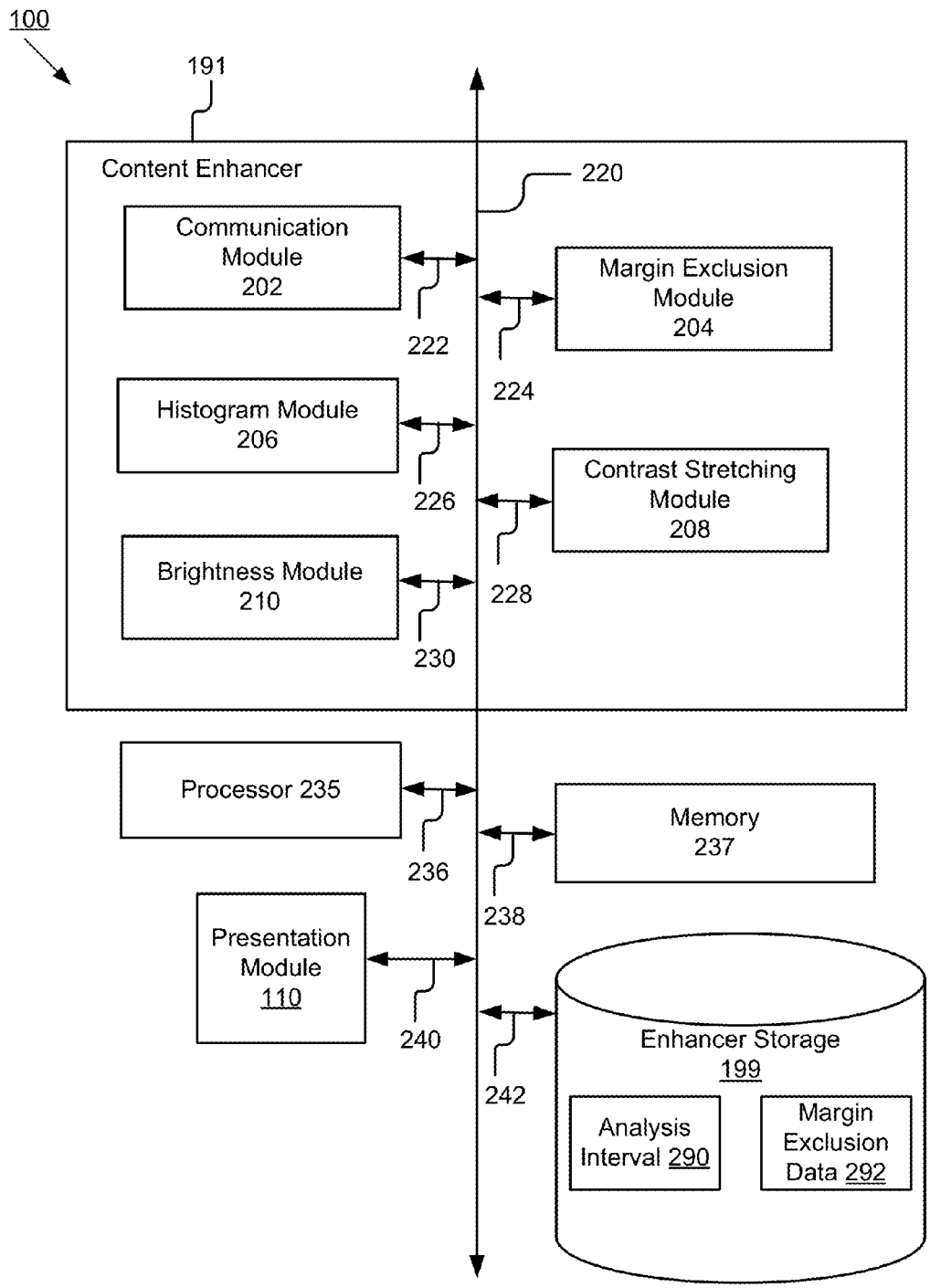
FIG. 2 is a block diagram of a content enhancer in accordance with an embodiment.

Referring now to FIG. 2, the content enhancer 191 is shown in more detail. FIG. 2 is a block diagram depicting an embodiment of the content hosting site 100. Depicted in FIG. 2 are the content enhancer 191, a processor 235, a memory 237, the presentation module 110 and the enhancer storage 199. In one embodiment, the components of the content hosting site 100 not depicted in FIG. 2 (e.g., the content serving module 104, content search module 106, upload server 108, thumbnail generator 112, etc.) are stored in the memory 237.

In one embodiment, the processor 235 is a computer processor of the content hosting site 100, and can be used to execute code and routines that comprise one or more of the content serving module 104, content search module 106, upload server 108, thumbnail generator 112, and the content enhancer 191. The processor 235 comprises an arithmetic logic unit, a microprocessor, a general purpose controller or some other processor array to perform computations and execute the content serving module 104, content search module 106, upload server 108, thumbnail generator 112 and the content enhancer 191. The processor 235 is coupled to the bus 220 for communication with the other components of the content hosting site 100.

The processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 236.

The memory 237 is a non-transitory storage medium. The memory 237 stores instructions and/or data that may be executed by the processor 235. For example, the memory 237 stores one or more of the modules of the content hosting site 100 described above with reference to FIG. 1. The memory 237 is communicatively coupled to the bus 220 for communication with the other components of the content hosting site 100. In one embodiment, the instructions and/or data stored on the memory 237 comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. The memory 237 is communicatively coupled to the bus 220 via signal line 238. In one embodiment, the memory 237 stores the content enhancer 191 and the sub-modules 202, 204, 206, 208, 210 that are included in the content enhancer 191.

The presentation module 110 is communicatively coupled to the bus 220 via signal line 240. The enhancer storage 199 is communicatively coupled to the bus 220 via signal line 242.

In one embodiment, the content enhancer 191 comprises a communication module 202, a margin exclusion module 204, a histogram module 206, a contrast stretching module 208 and a brightness module 210.

The communication module 202 includes code and routines that, when executed by processor 235, manages communications among the elements of the content enhancer 191 and the content hosting site 100. The communication module 202 is communicatively coupled to the bus 220 via signal line 222.

In one embodiment, the communication module 202 receives an input from a user 125 for requesting an enhancement of a content file. For example, responsive to a user 125 clicking a graphical button on a user interface displayed on a client device 115 indicating that the user 125 desires a content file (e.g., a video file) to be enhanced, the communication module 202 receives a request for enhancing the content file from the client device 115 via the network 105 and the front end interface 102. In one embodiment, the communication module 202 delivers the input for requesting an enhancement of a content file to the margin exclusion module 204 and/or the histogram module 206. In another embodiment, the communication module 202 receives an enhanced content file from the contrast stretching module 208 and/or the brightness module 210 and delivers the enhanced content file to the presentation module 110 that generates a user interface to display the enhanced content file.

The margin exclusion module 204 includes code and routines that, when executed by the processor 235, applies a margin exclusion value to a content file so that a portion of the video is not considered by the other modules 206, 208, 210 of the content enhancer 191. For example, assume a frame includes a border or closed captioning. Examples of a first frame including a border and a second frame including closed captioning will be described in further detail below with reference to FIGS. 5-6.

In one embodiment, the margin exclusion value specifies a fixed percentage amount of the edges of the frame (or picture) to be excluded from analysis by the other elements of the content enhancer 191. Accordingly, for the first frame (shown in FIG. 5), because the edges of the frame are not analyzed, the black margins on either side of the frame are not considered by the other elements of the content enhancer 191. Similarly, for the second frame (shown in FIG. 6), because the edges of the frame are not analyzed, the bottom portion of the frame including text for closed captioning are not considered by the other elements of the content enhancer 191.

In one embodiment, the margin exclusion value is based at least in part on an input received from an administrator of the content hosting site 100. For example, the margin exclusion value is configured so that 25% of the frame along each of the margins is excluded from the analysis provided by the content enhancer 191. In other words, 50% of the height of the frame is excluded from the analysis and 50% of the width of the frame is excluded from the analysis. In this way, the content enhancer 191 only analyzes the center of the frame.

The margin exclusion data 292 is data stored on the enhancer storage 199. The margin exclusion data 292 includes the margin exclusion value. In one embodiment, the margin exclusion data 292 includes any other data necessary for the content enhancer 191 to provide its functionality.

The margin exclusion module 204 processes the video file (or the image file) based at least in part on the margin exclusion value so that portions of the frames in the video (or portions of the picture) are excluded from processing by the histogram module 206, the contrast stretching module 208 and the brightness module 210. The margin exclusion module 204 is communicatively coupled to the bus 220 via signal line 224.

The histogram module 206 includes code and routines that, when executed by the processor 235, determines one or more histograms based on a content file and an analysis interval 290. The content file includes data for generating a graphical representation of content such as a video or a picture. The graphical representation is formed by numerous pixels. The pixels are formed by one or more of the colors red, green and blue. The colors red, green and blue are described below as channels. For example, for a given image, the image has a red channel, a green channel and a blue channel. In one embodiment, the channels include different and/or additional colors besides red, green and blue. The histogram describes pixel values for one or more channels (i.e., red, green or blue) sampled from a video over a period of time. In one embodiment, the histogram describes a weighted average of a channel over a period of time defined, for example, by an administrator. The analysis interval 290 includes data describing the period of time. In one embodiment, the histogram module 206 generates a first histogram for the red channel, a second histogram for the green channel and a third histogram for the blue channel. Thus, in one embodiment, the histogram module 206 generates more than one histogram for an image in a video. The histogram module 206 is communicatively coupled to the bus 220 via signal line 226.

In one embodiment, the histogram module 206 determines the analysis interval 290. In another embodiment, the histogram module 206 receives an input from an administrator of the content hosting site 100 indicating the analysis interval 290. The histogram module 206 generates one or more histograms for a content file based at least in part on the analysis interval 290 and the margin exclusion data 292 describing a margin exclusion value. For example, the histogram module 206 generates a histogram of pixel values (e.g., pixel intensities for a channel red, green, or blue) sampled from frames of the content file (e.g., a video file) within the analysis interval. The analysis interval is centered at the current input frame of the video file. In one embodiment, the pixel values in each frame within the analysis interval are weighted via a Gaussian distribution according to how close they are to the current frame. In this way, the contribution of a video frame gradually increases as it enters the analysis interval so that any sudden shifts are avoided. In one embodiment, the analysis interval defaults to 10 seconds. For example, the analysis interval defaults to 5 seconds on either side of the current frame.

The contrast stretching module 208 includes code and routines that, when executed by the processor 235, determines a contrast multiplier for adjusting the intensity of one or more of the channels based at least in part on the one or more histograms generated by the histogram module 206. In one embodiment, the contrast stretching module 208 determines a first contrast multiplier for the red channel, a second contrast multiplier for the green channel and a third contrast multiplier for the blue channel. For example, the contrast stretching module 208 generates one or more contrast multipliers based on the one or more histograms. In one embodiment, a contrast multiplier is a factor by which one or more pixel intensities for one or more pixels in a frame are multiplied in order to adjust the intensities for the one or more pixels.

In one embodiment, the contrast stretching module 208 determines a contrast multiplier for each of the red, green and blue channels and stretches contrasts for the red, green and blue channels of a video separately via multiplying pixel intensities by the contrast multiplier for each channel. Doing so provides, among other things, some level of color balancing.

In one embodiment, the contrast stretching module 208 determines a level threshold. For example, the level threshold defaults to 0.005. In one embodiment, the contrast stretching module 208 determines a contrast multiplier by applying the level threshold to the histogram. For example, the contrast stretching module 208 determines a certain percentile specified by the level threshold. Assume that the level threshold is 0.005. The contrast stretching module 208 determines the certain percentile as the 0.5th percentile. The contrast stretching module 208 then determines a contrast multiplier by finding the 0.5th percentile and the 100-0.5$^{th}$ percentile (e.g., 99.5$^{th}$ percentile) in the channel's histogram. The contrast stretching module 208 excludes the certain percentile (e.g., the 0.5$^{th}$ percent) of the highest and lowest pixels to allow for outliers. The benefits of doing so include, for example, but are not limited to, excluding a single white or black pixel anywhere in the image (or frame) that causes no contrast stretching to occur. The contrast stretching module 208 then multiplies the pixel values after the exclusion is applied so that the range between the highest and lowest points will occupy the total range of the pixel values in the range of color intensity, e.g., from 0-255, 0-1, or any other scheme for range of color intensity.

In one embodiment, the contrast stretching module 208 applies a contrast limit as described below. The contrast limit is beneficial, for example, when one or more frames in a video, or a picture, include an image that is almost completely black. For example, assume that after applying the contrast multiplier to an image that is predominately black in color to stretch the contrast of it to the range of 0-255, one or more artifacts are created from over-stretching. The contrast limit defines the maximum amount of how much contrast stretching is performed by the contrast stretching module 208. For example, the contrast limit defaults to a value of 5. In one embodiment, the contrast limit establishes an upper bound and a lower bound for the contrast stretching.

In one embodiment, there are one or more contrast limits. For example, each channel has a separate contrast limit. In one embodiment, the contrast limit is a value specified by an input received from an administrator of the content hosting site 100. In another embodiment, there is one contrast limit for the three different channels (i.e., the channels red, green or blue).

In one embodiment, the contrast stretching module 208 applies a color shifting limit as described below. For example, assume that the image of a frame depicts a sunset. The image of a frame contains a decreased amount of one or more color (i.e., the channels red, green or blue) relative to the other colors. Here, for example, the image of the sunset contains an increased amount of red because of the colors present at sunset. The contrast stretching module 208 analyzes the image to determine that the image contains a decreased amount of one or more of the colors relative to the other colors (e.g., here, the image contains a decreased amount of blue and green relative to the amount of red).

In one embodiment, the contrast stretching module 208 determines a color shifting limit based at least in part on an input from an administrator of the content hosting site 100 specifying the color shifting limit. The color shifting limit is a value that specifies the maximum amount of delta among the contrast multipliers for one or more of the red, green and blue channels. For example, the color shifting limit defaults to 1.0. The color shifting limit ensures that balance between the contrast adjustment made to the red, green and blue channels. In this way, images that have a certain color ratio among the different channels will maintain that balance (or an approximately similar balance) after the adjustment applied by the contrast stretching module 208.

In one embodiment, the contrast stretching module 208 calculates an average value of three contrast multipliers for three channels. The contrast stretching module 208 then adjusts the values of the three contrast multipliers to a range specified by the average value and the color shifting limit. For example, the range is centered at the average value with an upper and lower bound specified by the color shifting limit. In one embodiment, if color shifting limit is reached, then the contrast stretching module 208 adjusts the contrast multiplier so that the color shifting limit will not be exceeded. In the above example involving the image of a sunset, the color shifting limit is configured by the contrast stretching module 208 so that the pixel intensity for the red channel is reduced to create more balance between the red, green and blue channels. In one embodiment, the contrast stretching module 208 adjusts the contrast multiplier based on the color shifting limit so that the red, green and blue channels are at least substantially balanced. For example, as described above, after the contrast multiplier is applied, the balance between the red, green and blue channels remains the same or approximately the same.

In one embodiment involving the color shifting limit, it is not required that the red, green and blue channels be perfectly balanced. Rather, the purpose of the color shifting limit is to decrease the delta of pixel intensity among the red, green and blue channels so that a greater balance is achieved.

The contrast stretching module 208 is communicatively coupled to the bus 220 via signal line 228.

The brightness module 210 includes code and routines that, when executed by the processor 235, adjust the brightness for one or more pixels. In one embodiment, the brightness module 210 determines if an image or video is within a target window of acceptable brightness and adjusts the brightness of the image or video so that the brightness is within the target window. For example, assume that brightness is measured on a scale of 0 to 100 and the target window of acceptable brightness defaults to a range of 50 to 70.

In one embodiment, an administrator of the content hosting site 100 provides a brightness input to the content hosting site 100 that is stored in a memory such as the enhancer storage 199. The brightness input defines a target window of acceptable brightness levels. Assume that brightness is measured on a scale of 1 to 100. Further assume that the brightness input defines the target window 50 to 70. A video that has a brightness of 55 (e.g., an average brightness of 55) does not require the brightness to be adjusted since 55 is within the target window. By contrast, a video that has a brightness of 76 requires brightness adjustment so that it is darker (i.e., equal to or below 70). The brightness module 210 analyzes the video to determine that the brightness is 76 and then takes steps to darken the video. Similarly, a video having a brightness of 32 requires a brightness adjustment so that it is brighter (i.e., equal to or greater than 50). The brightness module 210 analyzes the video to determine that the brightness is 32 and then takes steps to brighten the video.

A person having ordinary skill in the art will recognize that in one embodiment, instead of specifying a target range, the administrator specifies a target value (e.g., 65) that all videos have to either match or be adjusted for by the brightness module 210.

In one embodiment, the brightness module 210 limits the total amount of brightness that it adds to an image or a frame of a video. For example, the total amount of brightness that it adds is calculated by dividing equally among the three channels (e.g., the channels red, green and blue). The brightness module 210 limits the total amount of added brightness to a brightness add limit for brightening images or frames of videos that are too dark. For example, assume that brightness is measured on a scale of 0 to 100 and that the brightness add limit defaults to 15. In another embodiment, the brightness module 210 limits the amount of brightness that it subtracts from an image or a frame of a video to a brightness subtract limit. For example, assume that brightness is measured on a scale of 0 to 100. The brightness subtract limit defaults to 5.

The brightness module 210 is communicatively coupled to the bus 220 via signal line 230.

In one embodiment, the content enhancer 191 is stored in a non-transitory memory of the client device 115. In one embodiment, the content enhancer is a component of a browser application (e.g., Google Chrome) or a media player application (e.g., a Java media player) stored in a non-transitory memory of the client device 115.

In one embodiment, the content enhancer 191 enhances the image of the content file responsive to a user input including data indicating that the user 125 wants to enhance the image. In another embodiment, the content enhancer 191 enhances the image at the time that the content file is uploaded to the content hosting site 100. For example, a user 125 uploads a content file and the content hosting site 100 transmits a message to the user 125 asking them whether they want to enhance the image. In another example, the user 125 uploads the content file and the content enhancer 191 enhances the image without asking for input from the user 125.

Methods

Figure 3:
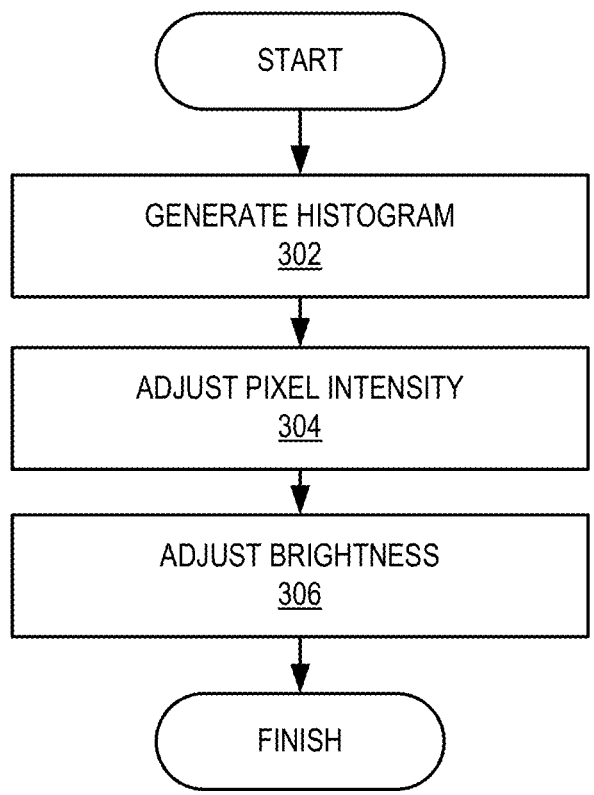
FIG. 3 is a flow diagram of a method for enhancing content in accordance with an embodiment.
Figure 4:
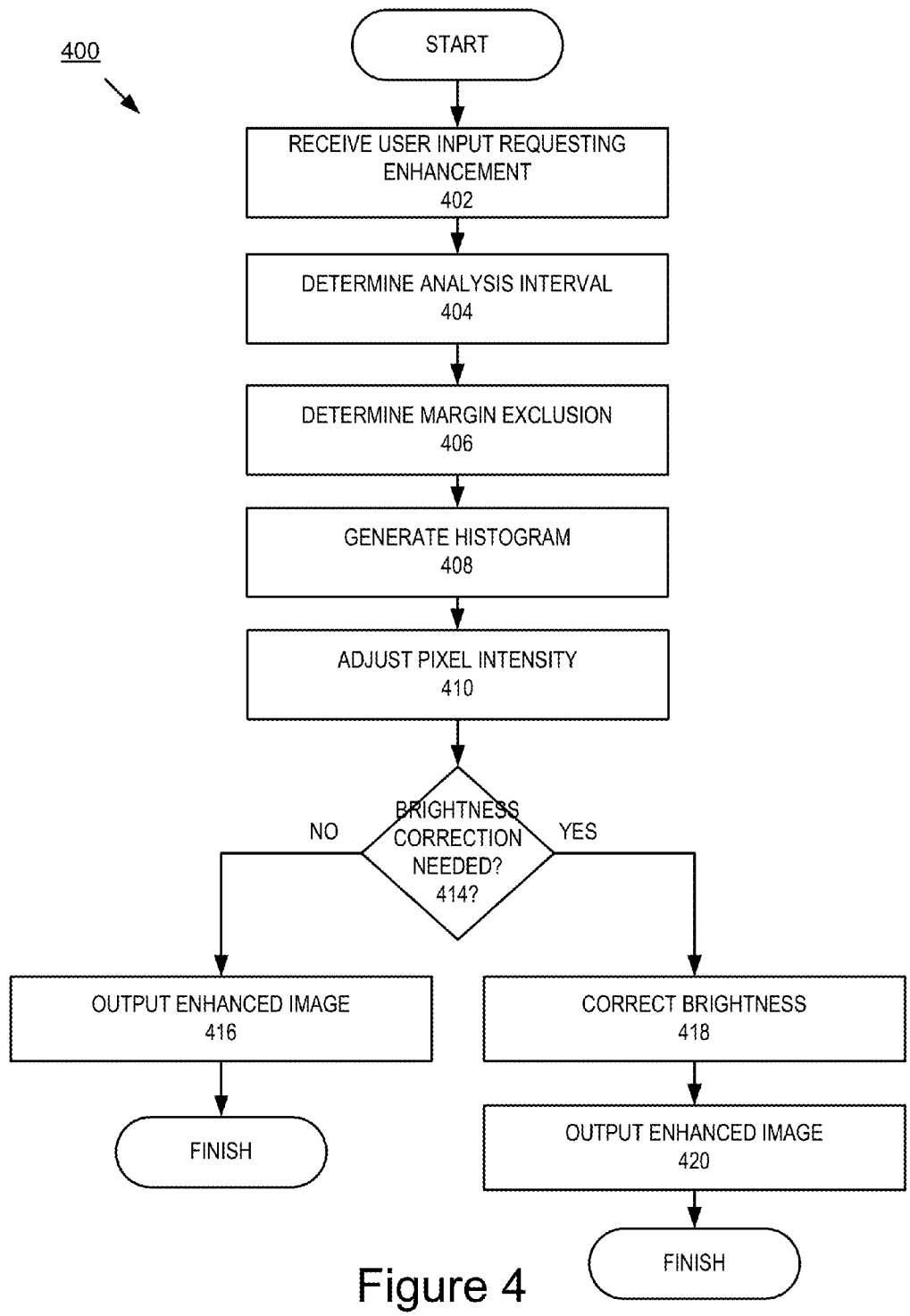
FIG. 4 is a flow diagram of a method for enhancing content in accordance with an embodiment.

FIGS. 3-4 depict various methods 300 and 400 performed by the system described above with reference to FIGS. 1-2.

FIG. 3 is a flow diagram depicting one embodiment of a method 300 for enhancing content. In one embodiment, the content enhancer 191 begins the method 300 responsive to receiving an input indicating that a user 125 of a client device 115 has clicked a graphical button to indicate that the user 125 desires a content file to be enhanced. At step 302, the content enhancer 191 generates a histogram. At step 304, the content enhancer 191 adjusts the contrast for one or more of the channels for all or a portion of a content file (e.g., a video or a picture). For example, the content enhancer 191 adjusts the contrast for one or more channels (e.g., red, green or blue) for one or more pixels in the content file. At step 306, the content enhancer 191 adjusts the brightness for all or a portion of a content file. For example, the content enhancer 191 adjusts the brightness for one or more channels (e.g., red, green or blue) for one or more pixels in the content file.

FIG. 4 is a flow diagram depicting one embodiment of a method 400 implemented by the content enhancer 191 for enhancing the image of a content file. At step 402, the content hosting site 100 receives a user input requesting an enhancement of an image for a content file. At step 404, the histogram module 206 determines an analysis interval 290 for generating one or more histograms. At step 406, the margin exclusion module 204 determines a margin exclusion value. For example, the margin exclusion module 204 determines the margin exclusion value based on the margin exclusion data 292. At step 408, the histogram module 206 generates one or more histograms for a content file based at least in part on the analysis interval 290 and the margin exclusion data 292. For example, the histogram module 206 generates one histogram for each of the three channels (red, green and blue). At step 410, the contrast stretching module 208 adjusts one or more pixel intensities of one or more channels included in the content file based at least in part on the one or more histograms generated by the histogram module 206. For example, the contrast stretching module 208 determines a contrast multiplier based at least in part on the one or more histograms and then adjusts the intensities of one or more of the pixels for one or more channels included in the content file based at least in part on the contrast multiplier.

In one embodiment, there are different histograms for a red channel, a blue channel and a green channel, and also different contrast multipliers for the different channels. A red contrast multiplier is determined by the contrast stretching module 208 for the red channel of an image based at least in part on a red histogram. A blue contrast multiplier is determined by the contrast stretching module 208 for the blue channel of an image based at least in part on a blue histogram. A green contrast multiplier is determined by the contrast stretching module 208 for the green channel of an image based at least in part on a green histogram. The contrast stretching module 208 adjusts pixel intensities for the different channels of the image based at least in part on the different corresponding contrast multipliers (e.g., the pixel intensities of the red channel for an image are adjusted based on the red contrast multiplier).

At step 414 the brightness module 210 analyzes the image generated after applying the one or more contrast multipliers to determine if brightness correction is needed. If brightness correction is not determined to be needed by the brightness module 210, then the method 400 moves to step 416 and the enhanced image is transmitted to the client device 115. If image enhancement is determined to be needed by the brightness module 210, then the method 400 proceeds to step 418. At step 418, the brightness module 210 adjusts the brightness of the image determined to need brightness correction at step 414. At step 420, the enhanced image is transmitted to the client device 115.

In one embodiment, the content enhancer 191 is stored in a non-transitory memory of the client 115. In this embodiment, the methods 300, 400 described above are implemented by the content enhancer 191 on the client device 115. In one embodiment, the content enhancer is a component of a browser application (e.g., Google Chrome) or a media player application (e.g., a Java media player).

Examples of Images

Figure 5:
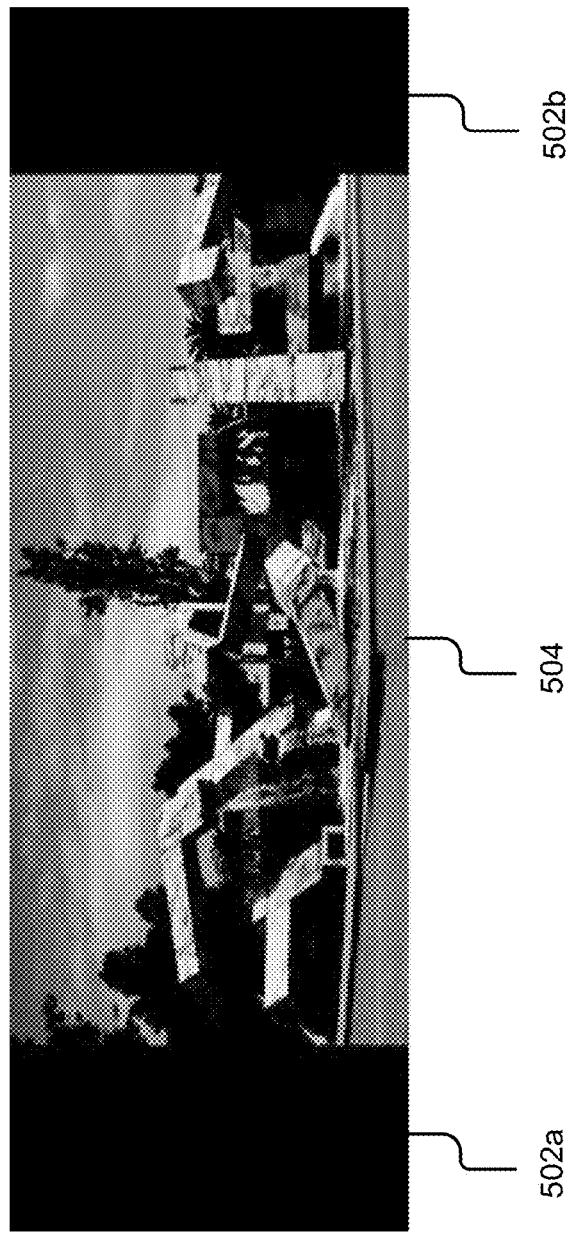
FIG. 5 is a graphic representation of an image including a border in accordance with an embodiment.

FIG. 5 depicts an example of a first frame 500 including a border. Elements 502a, 502b depicts black margins on either side of the first frame that are not considered when enhancing the frame. Element 504 depicts the center portion of the first frame excluding the borders 502a, 502b. For example, the center portion of the frame 504 is analyzed when doing enhancement of the first frame 500.

Figure 6:
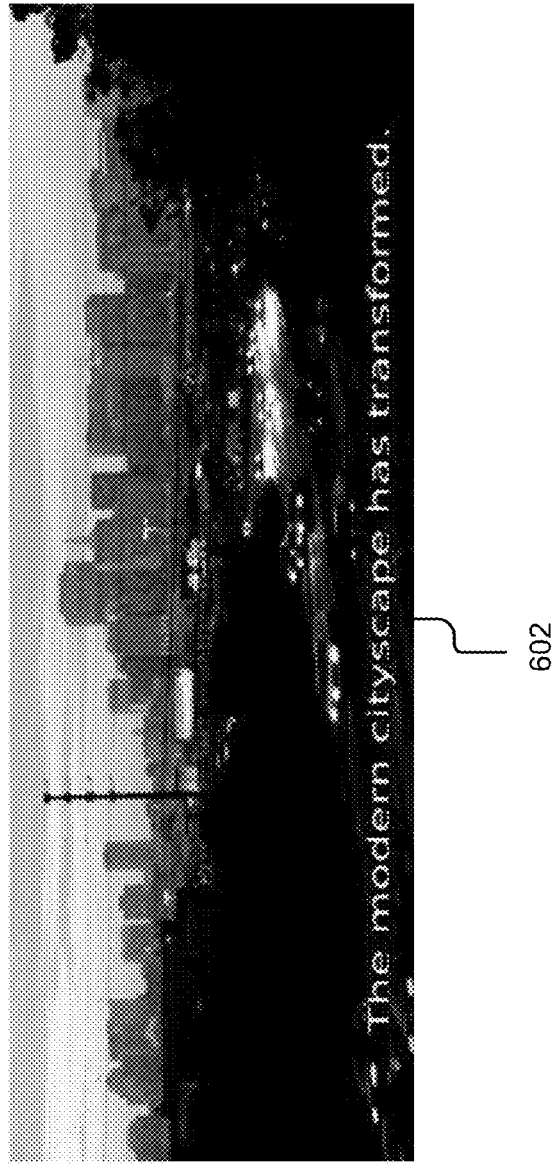
FIG. 6 is a graphic representation of an image including closed captioning in accordance with an embodiment.

FIG. 6 depicts an example of a second frame 600 including closed captioning. Element 602 depicts text for closed captioning that are not considered when enhancing the second frame 600.

Examples of Graphical User Interfaces ("GUIs")

Figure 7:
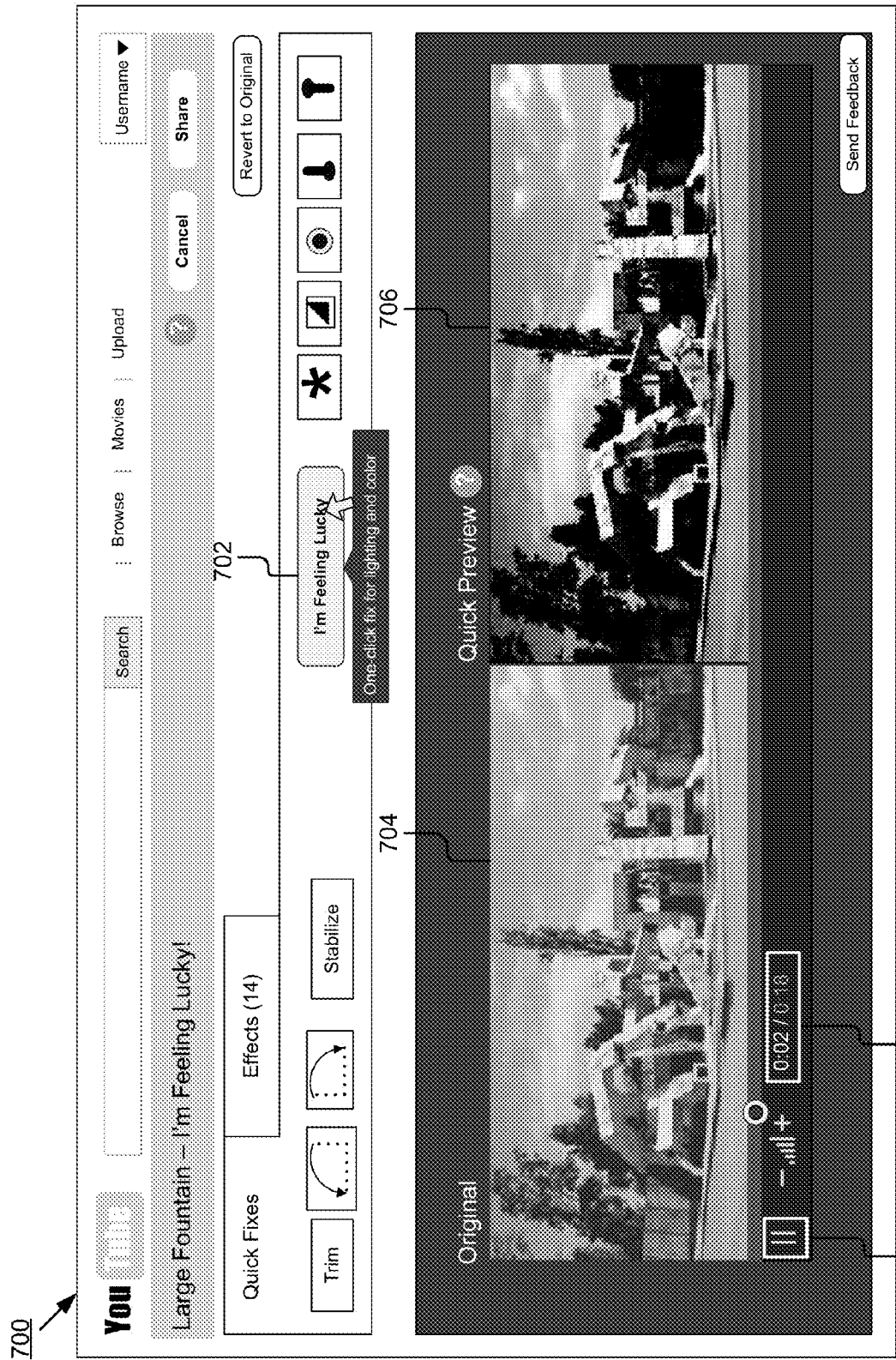
FIG. 7 is a graphic representation of a user interface displayed on a client device in accordance with an embodiment.

FIG. 7 depicts an example of a first GUI 700 for a media player executed on the client device 115. Element 702 is a graphical button clickable by the user 125 to request image enhancement for a video playable on the media player. For example, the user 125 clicks button 702 to cause the content enhancer 191 to begin to implement one or more of the methods 300, 400 described above. In this example, the button 702 is labeled by the text "I'm Feeling Lucky."

Element 704 depicts an example of a first image prior to content enhancement (the "Original" image). Element 706 depicts a preview of the first image after image enhancement by the content enhancer 191 as described herein. For example, the content enhancer 191 implements one or more of the methods 300, 400 described above to output the image depicted in element 706.

Element 708 is a graphic indicating that the video is paused. Element 710 is a graphic indicating the time count for the video. In this example, the time count indicates that the video is 18 seconds in length. The time count also indicates that 2 seconds of the video playback has occurred.

Figure 8:
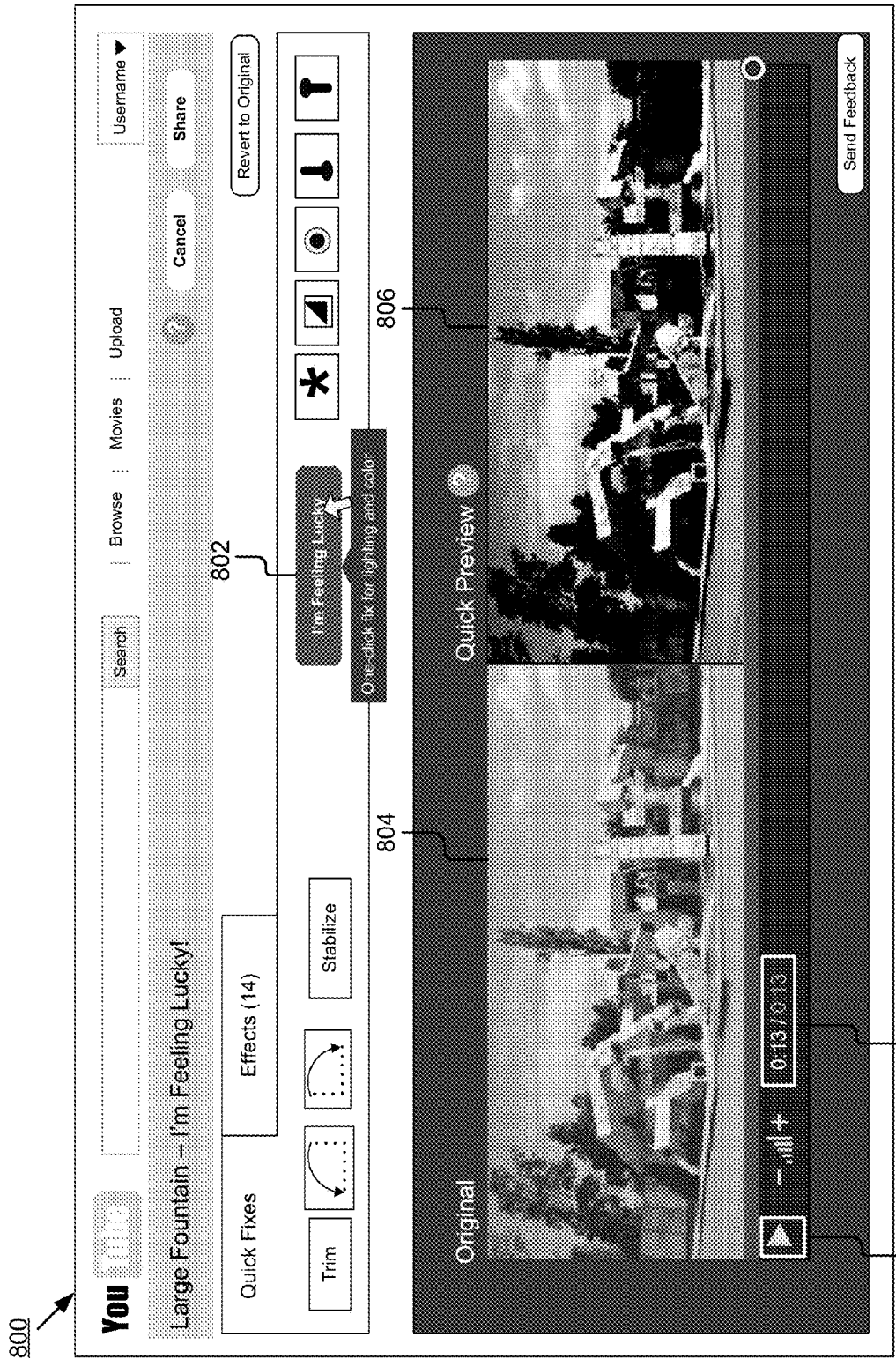
FIG. 8 is a graphic representation of a user interface displayed on a client device in accordance with another embodiment.

FIG. 8 depicts an example of a second GUI 800 for a media player executed on the client device 115. Element 802 is a graphical button clickable by the user 125 to request image enhancement for a video playable on the media player. In this example, the button 802 is labeled by the text "I'm Feeling Lucky."

Element 804 depicts an example of a first image prior to content enhancement (the "Original" image). Element 806 depicts a preview of the first image after image enhancement by the content enhancer 191 as described herein. For example, the content enhancer 191 implements one or more of the methods 300, 400 described above to output the image depicted in element 806.

Element 808 is a graphic indicating that the video is playing. In one embodiment, the content enhancer 191 provides image enhancement while the video is playing back. An example of this is depicted in FIG. 8. In another embodiment, the content enhancer 191 provides content enhancement when the video is paused. An example of this is depicted in FIG. 7.

Element 810 is a graphic indicating the time count for the video. In this example, the time count indicates that the video is 13 seconds in length. The time count also indicates that 13 seconds of the video playback has occurred.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification.

What is claimed is:

1. A computer-implemented method for enhancing a content file, executing on one or more computing devices, the method comprising:
    generating, using one or more computing devices, a histogram including data that describes one or more pixel intensities for one or more channels included in a content file;
    adjusting, using the one or more computing devices, the one or more pixel intensities for the one or more channels included in the content file based at least in part on the histogram;
    determining, using the one or more computing devices, whether a brightness level for the content file is within a range describing one or more acceptable brightness levels; and
    adjusting, using the one or more computing devices, the brightness level for the content file responsive to determining that the brightness level for the content file is outside the range.

2. The method of claim 1, wherein generating the histogram further comprises determining, using the one or more computing devices, an analysis interval during which the one or more pixel intensities are sampled from the content file.

3. The method of claim 1, wherein generating the histogram further comprises:
    determining, using the one or more computing devices, a margin exclusion value describing a fixed percentage amount of one or more edges of a frame described by the content file;
    determining, using the one or more computing devices, one or more portions of the frame described by the content file based at least in part on the margin exclusion value; and
    excluding, using the one or more computing device, the one or more portions from the frame described by the content file.

4. The method of claim 1, wherein adjusting the one or more pixel intensities further comprises:
    determining, using the one or more computing devices, a contrast multiplier based at least in part on the histogram; and
    multiplying, using the one or more computing devices, the one or more pixel intensities by the contrast multiplier to adjust the one or more pixel intensities.

5. The method of claim 4, wherein determining the contrast multiplier further comprises:
    determining, using the one or more computing devices, a level threshold;
    determining, using the one or more computing devices, a certain percentile of the highest and the lowest pixel intensities in the histogram based at least in part on the level threshold; and
    excluding, using the one or more computing devices, the certain percentile of the highest and the lowest pixel intensities from the histogram.

6. The method of claim 4, wherein determining the contrast multiplier further comprises adjusting, using the one or more computing devices, the contrast multiplier based at least in part on a limit so that a red channel, a green channel and a blue channel of the content file are at least substantially balanced.

7. The method of claim 1, wherein adjusting the brightness level for the content file further comprises limiting, using the one or more computing devices, an amount of brightness that is added to or subtracted from the content file.

8. A system for enhancing a content file, the system comprising:
   a histogram module for generating a histogram including data that describes one or more pixel intensities for one or more channels included in a content file;
   a contrast stretching module communicatively coupled to the histogram module for adjusting the one or more pixel intensities for the one or more channels included in the content file based at least in part on the histogram; and
   a brightness module communicatively coupled to the contrast stretching module for determining whether a brightness level for the content file is within a range describing one or more acceptable brightness levels, the brightness module further configured to adjust the brightness level for the content file responsive to determining that the brightness level for the content file is outside the range.

9. The system of claim 8, wherein generating the histogram further comprises determining an analysis interval during which the one or more pixel intensities are sampled from the content file.

10. The system of claim 8 further comprising a margin exclusion module communicatively coupled to the histogram module for determining a margin exclusion value describing a fixed percentage amount of one or more edges of a frame described by the content file, the margin exclusion module further configured to determine one or more portions of the frame described by the content file based at least in part on the margin exclusion value and to exclude the one or more portions from the frame described by the content file.

11. The system of claim 8, wherein adjusting the one or more pixel intensities further comprises:
   determining a contrast multiplier based at least in part on the histogram; and
   multiplying the one or more pixel intensities by the contrast multiplier to adjust the one or more pixel intensities.

12. The system of claim 11, wherein determining the contrast multiplier further comprises:
   determining a level threshold;
   determining a certain percentile of the highest and the lowest pixel intensities in the histogram based at least in part on the level threshold; and
   excluding the certain percentile of the highest and the lowest pixel intensities from the histogram.

13. The system of claim 11, wherein determining the contrast multiplier further comprises adjusting the contrast multiplier based at least in part on a limit so that a red channel, a green channel and a blue channel of the content file are at least substantially balanced.

14. The system of claim 8, wherein adjusting the brightness level for the content file further comprises limiting an amount of brightness that is added to or subtracted from the content file.

15. A computer program product comprising a non-transitory computer-readable storage medium including instructions that, when executed on a computer, causes the computer to perform operations comprising:
   generating a histogram including data that describes one or more pixel intensities for one or more channels included in a content file;
   adjusting the one or more pixel intensities for the one or more channels included in the content file based at least in part on the histogram;
   determining whether a brightness level for the content file is within a range describing one or more acceptable brightness levels; and
   adjusting the brightness level for the content file responsive to determining that the brightness level for the content file is outside the range.

16. The computer program product of claim 15, wherein generating the histogram further comprises determining an analysis interval during which the one or more pixel intensities are sampled from the content file.

17. The computer program product of claim 15, wherein generating the histogram further comprises:
   determining a margin exclusion value describing a fixed percentage amount of one or more edges of a frame described by the content file;
   determining one or more portions of the frame described by the content file based at least in part on the margin exclusion value; and
   excluding the one or more portions from the frame described by the content file.

18. The computer program product of claim 15, wherein adjusting the one or more pixel intensities further comprises:
   determining a contrast multiplier based at least in part on the histogram; and
   multiplying the one or more pixel intensities by the contrast multiplier to adjust the one or more pixel intensities.

19. The computer program product of claim 18, wherein determining the contrast multiplier further comprises:
   determining a level threshold;
   determining a certain percentile of the highest and the lowest pixel intensities in the histogram based at least in part on the level threshold; and
   excluding the certain percentile of the highest and the lowest pixel intensities from the histogram.

20. The computer program product of claim 18, wherein determining the contrast multiplier further comprises adjusting the contrast multiplier based at least in part on a limit so that a red channel, a green channel and a blue channel of the content file are at least substantially balanced.

21. The computer program product of claim 15, wherein adjusting the brightness level for the content file further comprises limiting an amount of brightness that is added to or subtracted from the content file.

* * * * *